Patented June 8, 1937

2,083,222

UNITED STATES PATENT OFFICE 2,083,222

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application December 24, 1936, Serial No. 117,582

10 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent used in my process, consists of a chemical compound or composition of matter obtained by reacting an aliphatic unsaturated hydrocarbon containing at least 8 carbon atoms and having a double bond at the end of the chain, with a strong sulfonating agent, and treating the product of sulfonation with a hydrolyzing agent.

The unsaturated hydrocarbons employed as raw material in the manufacture of said demulsifying agent or treating agent may be any aliphatic unsaturated hydrocarbons containing 8 or more carbon atoms and having a double bond at the end of the chain. Mixtures of such hydrocarbons may be employed. Or, the starting materials may be mixtures containing unsaturated hydrocarbons of the above described character and olefines in which the double linkage is not at the end of the chain. In general, more effective demulsifying agents are obtained when derived largely or entirely from hydrocarbons having a double linkage at the end of the chain. The aliphatic unsaturated hydrocarbons may be of the straight or branch chain type. Generally speaking, the straight chain hydrocarbons having a single bond at the end of the chain are preferred. Hydrocarbons of this kind may be obtained in any suitable manner, for example, by dehydrating the primary alcohols obtained by hydrogenating fatty acids or their esters, e. g. those found in palm oil, tallow, coconut oil and olive oil. Branch chain unsaturated hydrocarbons suitable for use as a raw material in preparation of the demulsifying agent used in the present process may be obtained in any desirable manner, for example, by polymerizing short chain olefines or by dehydrating synthetic higher alcohols or mixtures thereof, e. g. those produced by the hydrogenation of carbon oxides under elevated temperatures and pressures. Where branch chain hydrocarbons are employed the most effective demulsifying agents are obtained from those having the shortest side chains.

As previously stated, the unsaturated hydrocarbons, or mixtures thereof, should be reacted with strong sulfonating agents. By the expression "strong sulfonating agents" is meant sulfonating agents of greater sulfonating power than 100% sulfuric acid. Included among such sulfonating agents are compounds which per se have a greater sulfonating power than 100% sulfuric acid, such as, for example, sulfur trioxide, chlorsulfonic acid, bromsulfonic acid, oleum and acetyl sulfuric acid. In practice, it is preferable to employ this class of sulfonating agents, and especially desirable results have been obtained with chlorsulfonic acid. Where sulfur trioxide is employed, it may be introduced into the reaction mixture either in gaseous, liquid or solid form. As examples of other strong sulfonating agents may be mentioned milder sulfonating agents, such as sulfuric acid, in combination with reagents capable of removing water from the reaction mass, such as, for example, acetyl chloride, glacial acetic acid, acetic anhydride, propionic acid, propionic anhydride, phosphorous pentoxide, phosphorous oxychloride, and boric anhydride. If desired, dehydrating agents may be employed in connection with the sulfonating agents which in themselves are strongly sulfonating, viz. sulfur trioxide, chlorsulfonic acid, oleum and the like, but there appears to be very little added advantage in such a procedure.

The proportions of the sulfonating agents may vary within relatively wide limits depending largely upon the nature of the reactants. In general, it is preferable to employ about 1 to 2 moles of sulfonating agent for each double bond per mole of an unsaturated hydrocarbon. In certain cases, however, it may be desirable to use larger or smaller proportions of the sulfonating agent, it being understood that the desired reaction proceeds whether a small or large amount of sulfonating agent is employed.

The sulfonation may be effected in a solvent or suspension medium, that is to say, a medium which is liquid at the temperature of the reaction and is inert to the reactants or does not affect the reaction unfavorably. As examples of solvent or suspension media one may mention carbon tetrachloride, ethylene dichloride, trichlorethylene, tetrachlorethane, chloroform, liquid sulfur dioxide, diethylether, acetic anhydride, propionic acid and propionic anhydride. Generally speaking, it is preferable to employ carbon tetrachloride. Solvent or suspension media are especially desirable when the sulfonating agent is sulfur trioxide.

The time allowed for the sulfonation to take place will depend largely upon the nature of the reactants and the conditions of temperature. Under ordinary operating conditions it may vary from about 2 to 48 hours. If desired, the sulfonation may be carried on almost indefinitely. In practice, therefore, it is customary to carry out this reaction until further sulfonation has little if any effect on the results obtained.

While the temperature maintained in effecting the sulfonation may vary within relatively wide limits, the temperature employed should preferably be below that giving rise to decomposition, resinification, or polymerization of the reactants and products. In general it is preferable to maintain the temperatures in this step of the process below about 50° C. and preferably within the range of about −10 to +30° C. Ordinarily higher temperatures tend to yield darker products, and also to cause the liberation of sulfur dioxide.

The treatment of the sulfonated product to effect hydrolysis thereof may be carried out in a number of ways. Thus, water may be added until the acid concentration is relatively low and the resultant product boiled; or the sulfonated product may be neutralized and then heated with a hydrolyzing agent. In some cases it may be possible to effect hydrolysis, at least in part, by merely neutralizing the sulfonation product with an aqueous alkaline reagent and then boiling the resultant product. Hydrolyzing agents which are suitable for the practice of the invention are mineral acids, e. g. hydrochloric, sulfuric and the like or alkaline reagents, e. g. alkali metal and alkaline earth metal hydroxides. In practice it is usually preferable to neutralize the sulfonated product with an aqueous solution of an alkali metal hydroxide, preferably sodium hydroxide, and add a further quantity of the alkali metal hydroxide as a hydrolyzing agent.

The amount of the alkaline reagent employed for neutralization and hydrolysis of the sulfonation product should preferably correspond to at least one equivalent for every equivalent of the sulfonating agent used. Thus if the sulfonation is carried out with one mole of sulfur trioxide, neutralization and hydrolysis of the product may be effected with 2 moles of sodium hydroxide. In general it is preferable to use an excess of the alkaline reagent over the amount required for neutralization and hydrolysis.

The amount of water present during the hydrolysis may vary widely. Very satisfactory results are obtained, however, when the sulfonated product is heated with solutions of mineral acids, alkali metal hydroxides or alkaline earth metal hydroxides having concentrations of about 2–20%.

The temperature of the hydrolysis is subject to considerable variation but should preferably be above 50° C. and below the temperature at which the reactants or products decompose. A temperature of about 100° C. is normally satisfactory for carrying out the hydrolysis. If a solvent or suspension medium is used in the sulfonation, it is preferably removed prior to or during the hydrolysis by evaporation, steam distillation or in any other suitable manner.

Throughout the specification and claims, in so far that the subject matter relates to sulfonation and hydrolysis, it will be understood that the oxygen derivatives of sulfur which are employed in accordance with the invention are sulfonating agents; that is, they are capable of introducing a sulfonic acid residue into the unsaturated hydrocarbon at the unsaturated bond. The expression "treatment with a hydrolyzing agent" is intended to cover a hydrolytic treatment capable of removing acid residues other than sulfonic acid residues from the sulfonated hydrocarbon.

The general procedure above described for the manufacture of these compounds is well known. The above description of the manufacturing procedure is found in substantially verbatim form in one or more of the following U. S. Patents: #2,061,617, November 24, 1936, Downing and Clarkson; #2,061,618, November 24, 1936, Downing and Clarkson; #2,061,619, November 24, 1936, Downing and Clarkson; #2,061,620, November 24, 1936, Downing and Clarkson.

Sulfonation may take place if desired in the presence of a suitable catalyst, such as certain inorganic oxides and silver salts as described in U. S. Patent #2,061,620 aforementioned, or in the presence of a chlorinating catalyst, as described in U. S. Patent #2,061,619 mentioned above. Various catalysts include the oxides and salts of antimony, copper, manganese, iron, vanadium, aluminum, alkali metal iodides, free iodine, silver salts, silver oxides, etc.

The following examples illustrate methods of preparing the reagent.

*Example 1*

30 parts of a mixture of olefines (B. P. 245–260° C.) consisting substantially of 1,2-hexadecylene, prepared by dehydrating the appropriate fraction of primary alcohols (B. P. 190–225° C. at 65 mm.) obtained from the hydrogenation of coconut oil, are dissolved in 125 parts of carbon tetrachloride and the mixture cooled to 0° C. 20 parts of chlorsulfonic acid are then added slowly with vigorous stirring and the mixture kept cold for 3 hours. The reaction liquid is then treated with water and neutralized with 20% sodium hydroxide solution and 6 parts excess sodium hydroxide added. The carbon tetrachloride is steam distilled off and recovered and the residual liquid boiled for 30 minutes. The product is neutralized with 10% sulfuric acid and the immiscible oil which forms in the mixture separated. The aqueous solution is then evaporated to a thick reddish brown oil clearly soluble in water.

*Example 2*

20 parts 1-2-octadecylene (B. P. 180–205° C. at 30 mm. Iodine No. 64.7) obtained by dehydrating substantially pure primary n-octadecyl alcohol, dissolved in about 80 parts of carbon tetrachloride, approximately one-tenth part of mercury suspended in the solution which is cooled to about 0–5° C. 12 parts of chlorsulfonic acid are added slowly to the mixture and the resultant mixture being maintained at the above low temperature for a period of about 2 more hours. At the end of this time the temperature is allowed to rise to about 20-25° C. After standing at this temperature for about 12 to 14 hours the liquid is poured into water, neutralized with 20% sodium hydroxide solution and about 10 parts of excess sodium hydroxide added. The product is boiled for one hour to hydrolyze it and to remove carbon tetrachloride. The resultant solution is neutralized with 10% sulfuric acid solution and then evaporated to a small volume. The product is isolated by precipitating the inorganic salts with an excess of ethyl alcohol, filtering the alcohol solution and evaporating off the alcohol and water. The resultant product is a light brown oil, clearly soluble in water.

It is understood that these materials are characterized by the presence of a sulfonic acid radical, and may be in the form of the free acid itself or the salt or ester. For instance, in the procedure outlined above the products are manufactured as sodium salts. Naturally, such sodium salts may be treated with any strong mineral acid, such as a solution of sulfuric acid in moderate strength, or hydrochloric acid, to liberate the corresponding sulfonic acid. Such sulfonic acid may be used as a demulsifying agent in the present process for breaking petroleum emulsions. However, due to the corrosive properties of such acidic material, it is more desirable to convert the material into a salt or ester. Esterification of such sulfonic acids is rather expensive because it is generally necessary to convert the sulfonic acid into a sulfonchloride and react the sulfonchloride with a suitable alcohol. From a practical standpoint it is most desirable, therefore, to use these materials in the form of a salt. Free sulfonic acids of the kind described may be reacted with any suitable base, such as caustic soda, caustic potash, ammonium hydroxide, or the like, so as to convert the materials into the corresponding salts. Similarly, instead of ammonia, one may use triethanolamine, diethanolamine, benzylamine, cyclohexylamine, monoamylamine, diamylamine, triamylamine, or any other suitable amine. Sulfonic acids of the kind described above may be reacted with calcium oxide, magnesium oxide, and the like. Similarly, one may produce heavy metal salts, such as copper salts, iron salts, lead salts, etc. The heavy metal salts and higher molecular weight amine salts are often oil-soluble. In some instances the higher molecular weight amine salts may be oil and water soluble. My preferred demulsifying agent is obtained by use of an alkylolamine, such as triethanolamine, to produce a water-soluble salt. As previously stated, one may convert the sulfonic acids into suitable esters derived from alcohol, such as methyl alcohol, ethyl alcohol, propyl alcohol, butyl alcohol, amyl alcohol, hexyl alcohol, benzyl alcohol, cyclohexanol, etc.

It so happens that the chemical constitution of the products obtained in accordance with the general procedure outlined above, and in greater detail in the aforementioned U. S. Patents, #2,061,617, #2,061,618, #2,061,619 and #2,061,620, has not been definitely determined and, therefore, it is impossible to describe the demulsifying agents employed in the present process completely and specifically in terms of their exact composition. It is apparent that the reactions employed are such that the compounds obtained are largely hydroxysulfonic acid derivatives of aliphatic hydrocarbons in which a hydroxy group and a sulfonic acid residue occur on the last 2 carbon atoms of an aliphatic chain, having 8 or more carbon atoms. It is not known whether the sulfonic acid group or the hydroxy group occur on the alpha carbon atom of the hydrocarbon chain. Possibly the products may be isomeric mixtures of compounds in which the sulfonic acid residue occurs on the alpha carbon atom, and those which occur on the beta carbon atom depending upon the specific sulfonating agent used, the unsaturated hydrocarbon acted upon, the presence or absence of specific sulfonating agents, the presence or absence of branch chains, variations in conditions of sulfonation, etc.

If the unsaturated hydrocarbon reacted upon has an unsaturated bond at the end of the hydrocarbon chain and also on another portion of the chain, it is possible that a hydroxy group and a sulfonic group will be introduced into this unsaturated bond also. It is understood, therefore, that even in the absence of information as to the complete composition of the materials thus obtained, one can properly say that the demulsifying agents of the kind contemplated for use in the present process include specifically hydroxysulfonic acids of aliphatic hydrocarbons (as well as their salts and esters) in which a hydroxy group and a sulfonic acid residue occur on the last 2 carbon atoms of an aliphatic chain containing 8 or more carbon atoms, and preferably so as to contain 20 to 30 carbon atoms.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc.. may be employed as diluents. Miscellaneous solvents, such as pine oil, carbon tetrachloride, sulfur dioxide extract obtained in the refining of petroleum, etc., may be employed as diluents. Similarly, the chemical compound employed as the demulsifying agent of my process may be admixed with one or more of the solvents customarily used in connection with conventional demulsifying agents. Moreover, said chemical compound may be used alone or in admixture with other suitable well known classes of demulsifying agents, such as demulsifying agents of the modified fatty acid type, the petroleum sulfonate type, the alkylated sulfoaromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

In the claims the expression "sulfonated hydrocarbon body" is intended to refer to the materials obtained by sulfonation and hydrolysis, either as an acid, or after conversion into salts or conversion into esters. The materials are characterized by the primary reactions of manufacture and not by subsequent reactions, such as salt formation or ester formation, in which an ionizable hydrogen atom equivalent in one form is converted into another form of the same ionizable hydrogen atom equivalent.

Having thus described my invention, what I claim as new and desire to secure by Letters Patent is:

1. A process for breaking petroleum emulsions of the water-in-oil type, which consists in subjecting the emulsion to the action of a demulsifying agent comprising a sulfonated hydrocarbon body obtained by reacting an aliphatic unsaturated hydrocarbon containing at least 8 carbon atoms and having a double bond at the end of the chain, with a strong sulfonating agent, and hydrolyzing the reaction product.

2. A process for breaking petroleum emulsions of the water-in-oil type, which consists in subjecting the emulsion to the action of a demulsifying agent comprising a sulfonated hydrocarbon body obtained by reacting an aliphatic unsaturated hydrocarbon containing at least 8 carbon atoms, having a double bond at the end of the chain and free from any side chains, with a strong sulfonating agent, and hydrolyzing the reaction product.

3. A process for breaking petroleum emulsions of the water-in-oil type, which consists in subjecting the emulsion to the action of a demulsifying agent comprising a sulfonated hydrocarbon body obtained by reacting an aliphatic unsaturated hydrocarbon containing at least 20 carbon atoms and not more than 30 carbon atoms, having a double bond at the end of the chain and free from any side chains, with a strong sulfonating agent, and hydrolyzing the reaction product.

4. A process for breaking petroleum emulsions of the water-in-oil type, which consists in subjecting the emulsion to the action of a demulsifying agent comprising a sulfonated hydrocarbon body obtained by reacting an aliphatic unsaturated hydrocarbon containing at least 20 carbon atoms and not more than 30 carbon atoms, having a double bond at the end of the chain and free from any side chains, with a strong sulfonating agent, and hydrolyzing the reaction product, by means of an alkaline reagent.

5. A process for breaking petroleum emulsions of the water-in-oil type, which consists in subjecting the emulsion to the action of a demulsifying agent, comprising a hydroxysulfonic acid derived from an aliphatic hydrocarbon having at least 20 carbon atoms and not more than 30 carbon atoms in the chain and free from any side chains, and further characterized by the presence of a hydroxyl group and a sulfonic acid residue attached to the last 2 carbon atoms of the aliphatic chain.

6. A process for breaking petroleum emulsions of the water-in-oil type, which consists in subjecting the emulsion to the action of a demulsifying agent in the form of a salt, comprising a hydroxysulfonic acid derived from an aliphatic hydrocarbon having at least 20 carbon atoms and not more than 30 carbon atoms in the chain and free from any side chains, and further characterized by the presence of a hydroxyl group and a sulfonic acid residue attached to the last 2 carbon atoms of the aliphatic chain.

7. A process for breaking petroleum emulsions of the water-in-oil type, which consists in subjecting the emulsion to the action of a demulsifying agent in the form of a water-soluble salt, comprising a hydroxysulfonic acid derived from an aliphatic hydrocarbon having at least 20 carbon atoms and not more than 30 carbon atoms in the chain and free from any side chains, and further characterized by the presence of a hydroxyl group and a sulfonic acid residue attached to the last 2 carbon atoms of the aliphatic chain.

8. A process for breaking petroleum emulsions of the water-in-oil type, which consists in subjecting the emulsion to the action of a demulsifying agent in the form of a water-soluble amine salt, comprising a hydroxysulfonic acid derived from an aliphatic hydrocarbon having at least 20 carbon atoms and not more than 30 carbon atoms in the chain and free from any side chains, and further characterized by the presence of a hydroxyl group and a sulfonic acid residue attached to the last 2 carbon atoms of the aliphatic chain.

9. A process for breaking petroleum emulsions of the water-in-oil type, which consists in subjecting the emulsion to the action of a demulsifying agent in the form of a water-soluble alkylolamine salt, comprising a hydroxysulfonic acid derived from an aliphatic hydrocarbon having at least 20 carbon atoms and not more than 30 carbon atoms in the chain and free from any side chains, and further characterized by the presence of a hydroxyl group and a sulfonic acid residue attached to the last 2 carbon atoms of the aliphatic chain.

10. A process for breaking petroleum emulsions of the water-in-oil type, which consists in subjecting the emulsion to the action of a demulsifying agent in the form of a water-soluble triethanolamine salt, comprising a hydroxysulfonic acid derived from an aliphatic hydrocarbon having at least 20 carbon atoms and not more than 30 carbon atoms in the chain and free from any side chains, and further characterized by the presence of a hydroxyl group and a sulfonic acid residue attached to the last 2 carbon atoms of the aliphatic chain.

MELVIN DE GROOTE.